United States Patent
Turgman et al.

(10) Patent No.: US 9,226,105 B2
(45) Date of Patent: Dec. 29, 2015

(54) MUTUAL INTEREST LOCATION MATCHING (75) Inventors: Ami Turgman, Tel Aviv (IL); Saar Yahalom, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 352 days.

(21) Appl. No.: 13/570,248

(22) Filed: Aug. 9, 2012

(65) Prior Publication Data

US 2014/0045516 A1 Feb. 13, 2014

(51) Int. Cl.
- *H04W 4/12* (2009.01)
- *G08B 21/22* (2006.01)
- *H04W 4/02* (2009.01)

(52) U.S. Cl.
CPC .. *H04W 4/02* (2013.01); *H04W 4/12* (2013.01)

(58) Field of Classification Search
CPC .................................. H04W 4/02; H04W 4/12
USPC ................ 455/414.1, 456.1–456.6, 457, 517; 701/300
See application file for complete search history.

(56) References Cited

U.S. PATENT DOCUMENTS

| 7,899,469 | B2 | | 3/2011 | Casey |
| 8,682,349 | B2 | * | 3/2014 | Sayed .......................... 455/456.3 |
| 8,725,131 | B1 | * | 5/2014 | Kirkham et al. ............... 455/417 |
| 8,831,632 | B2 | * | 9/2014 | Laws et al. ................... 455/456.1 |
| 8,838,477 | B2 | * | 9/2014 | Moshfeghi .................. 705/14.58 |
| 2007/0093258 | A1 | | 4/2007 | Steenstra et al. |
| 2007/0237096 | A1 | | 10/2007 | Vengroff et al. |
| 2010/0262932 | A1 | | 10/2010 | Pan |
| 2011/0179064 | A1 | * | 7/2011 | Russo ............................ 707/769 |
| 2012/0008526 | A1 | * | 1/2012 | Borghei ......................... 370/254 |
| 2012/0165035 | A1 | * | 6/2012 | Chen et al. .................. 455/456.1 |
| 2012/0245990 | A1 | * | 9/2012 | Agarwal ..................... 705/14.25 |
| 2012/0259537 | A1 | * | 10/2012 | Schmidt et al. ............... 701/300 |
| 2013/0080204 | A1 | * | 3/2013 | Khorashadi et al. ......... 705/7.19 |
| 2013/0227026 | A1 | * | 8/2013 | Jayaram et al. ............... 709/205 |
| 2013/0237254 | A1 | * | 9/2013 | Papakipos et al. ......... 455/456.3 |
| 2013/0278403 | A1 | * | 10/2013 | Morgan et al. ........... 340/426.19 |

(Continued)

OTHER PUBLICATIONS

Zheng, et al., "GeoLife2.0: A Location-Based Social Networking Service", Retrieved at <<http://ieeexplore.ieee.org/stamp/stamp.jsp?tp=&arnumber=5088957>>, Proceedings: Tenth International Conference on Mobile Data Management: Systems, Services and Middleware, May 18-20, 2009.

(Continued)

*Primary Examiner* — Khawar Iqbal
(74) *Attorney, Agent, or Firm* — Steven Spellman; Douglas Barker; Mickey Minhas (57) ABSTRACT

Architecture that enables users to define user interests, and when two or more people with matching interests (mutual) are identified in the same geographical area, the architecture actively notifies either one or both of the users (e.g., based on a given scenario). After being notified, either or both users can decide how to act (e.g., the user that wants to buy the car can call the user that wants to sell the car and then set a meeting at a suitable time). The architecture automatically creates dynamic geo-fences in association with users to perform different location-based matching scenarios. The locations of the users are continuously identified as the users move in a geographical area. When a matching interest is identified, the architecture actively notifies the users of items that might be of interest and which are currently occurring in the user vicinity.

20 Claims, 6 Drawing Sheets

(56) References Cited

U.S. PATENT DOCUMENTS

2014/0019615 A1\* 1/2014 Jennings .................. 709/224
2014/0342759 A1\* 11/2014 Nichols ................. 455/456.3

OTHER PUBLICATIONS

Huang, et al., "On Geo-Social Network Services", Retrieved at <<Liuhttp://ieeexplore.ieee.org/stamp/stamp.jsp?tp=&arnumber=5293492>>, Proceedings: 17th International Conference on Geoinformatics, Aug. 12-14, 2009.

"Discovering Nearby Places Based on Automatic Query", U.S. Appl. No. 13/110,011, filed May 18, 2011.

"Connection of Users by Geolocation", U.S. Appl. No. 13/293,093, filed Nov. 9, 2011.

\* cited by examiner

MUTUAL INTEREST LOCATION MATCHING

BACKGROUND

There exist applications that enable users to learn what is happening around them, but the applications are predominantly for business needs such as advertisements, coupons, and so on. However, the users have to actively open an application to look for this information. For example, a user X would like to know when user Y, with something that might be of interest to user X, is near. However, both user X and user Y change their locations constantly. When both user X and user Y are in the same area, user X, who has the interest, would like to be actively notified of the interest and then decide how to act. However, such capabilities are lacking in conventional architectures.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture enables users to define user interests (e.g., buy/sell a car, give/catch a ride, etc.), and when two or more people with matching interests (mutual) are identified in the same geographical area, the architecture actively notifies either one or both of the users (e.g., based on a given scenario). After being notified, either or both users can decide how to act (e.g., the user that wants to buy the car can call the user that wants to sell the car and then set a meeting at a suitable time).

The architecture automatically creates dynamic geo-fences in association with users to perform different location-based matching scenarios. The locations of the users are continuously identified as the users move in a geographical area. When a matching interest is identified, the architecture actively notifies the users of items that might be of interest and which are currently occurring in the user vicinity.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The disclosed architecture enables the identification of matching interests between two or more users who are constantly changing their geographical locations. In one scenario, user A would like to buy a car of a specific model and specific range of purchase prices. User A defines a profile of the desired car. User B defines a profile that indicates the desire to sell a car and, defines the car model and the selling price. If both user A and B are concurrently in the same geographical area and there is a match in the user profiles, user A can be actively notified (e.g., push notification such as short message service (SMS)) with the information about the match. Since both users are currently in the same geographical area, as defined in part by the user-assigned geo-fences, the users can choose to meet and move forward on the transaction, such as show the car.

In another example, a user A is willing to give rides to other users. User A creates a profile that defines a destination for carpooling, and other users create associated profiles that define the desire for rides, and optionally, to specific destinations. Thereafter, if user A enters a region in which one (or more) of the other users wants a ride to the same destination, user A will be notified and can then decide whether or not to pick-up the other user(s) while on the way to the destination.

More specifically, the architecture creates a geo-fence in association with (e.g., around) user A which continuously checks matching profiles by an interesting geo-fence. The geo-fence is a virtual perimeter of predetermined dimensions (e.g., circular with a given radius, a polygon with multiple radii that help define its perimeter boundaries, etc.) created in association with a user, where the geo-fence can be centered on the user, or related to (associated with) the user in some way in a data store. The geo-fence is dynamic, in that the geo-fence moves with the associated user. When the geo-fences associated with the matching profiles of the users intersect, a notification is triggered to either or both of the users A and B.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
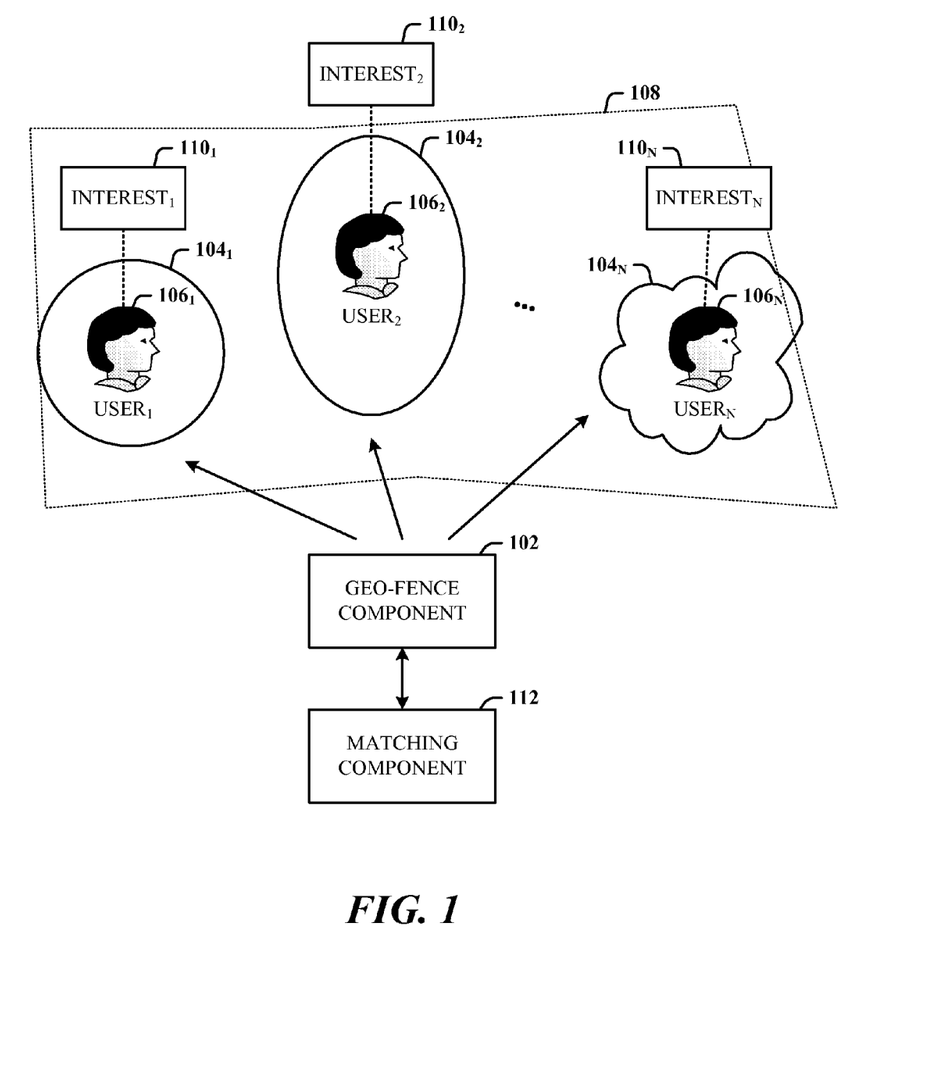
FIG. 1 illustrates a system in accordance with the disclosed architecture.

FIG. 1 illustrates a system 100 in accordance with the disclosed architecture. The system 100 can include a geo-fence component 102 that automatically generates geo-fences $104_{1-N}$ for corresponding users $106_{1-N}$ (denoted $USER_1, USER_2, \ldots, USER_N$). The geo-fences $104_{1-N}$ are dynamic, in that the geo-fences $104_{1-N}$ move with the associated moving users $106_{1-N}$ in a geographical area 108. Each of the users $106_{1-N}$ can be seeking others of the users $106_{1-N}$ in the geographical area 108 that have interests $110_{1-N}$ that match. A matching component 112 identifies matches in the user interests $110_{1-N}$ of the users $106_{1-N}$ moving in the geographical area 108 based on intersections of the geo-fences $104_{1-N}$. This can be accomplished by the geo-fence component 102 detecting that two geo-fences have intersected.

For example, a first user $106_1$ creates a user profile that defines a first interest $110_1$, a second user $106_2$ creates a user profile that defines a second interest $110_2$, and an Nth user $106_N$ creates a user profile that defines an Nth interest $110_N$. The geo-fence component 102 automatically creates a first geo-fence $104_1$ for the first user $106_1$, a second geo-fence $104_2$ for the second user $106_2$, and an Nth geo-fence $104_N$ for the Nth user $106_N$. The geo-fence can be created based on any number of criteria: for example, when a user enters the area 108, departs a location (e.g., an office), the user is detected as moving, time of day, day of the week, in response to computing that at least one other user is in the area 108 or heading to the area 108 and that may have a matching interest, and so on.

The interests $110_N$ can be personally related (e.g., shopping, travel, etc.), business related (e.g., converging on a meeting, moving on campus to find another user of interest, etc.), or any other purpose suited for the disclosed architecture.

Figure 2:
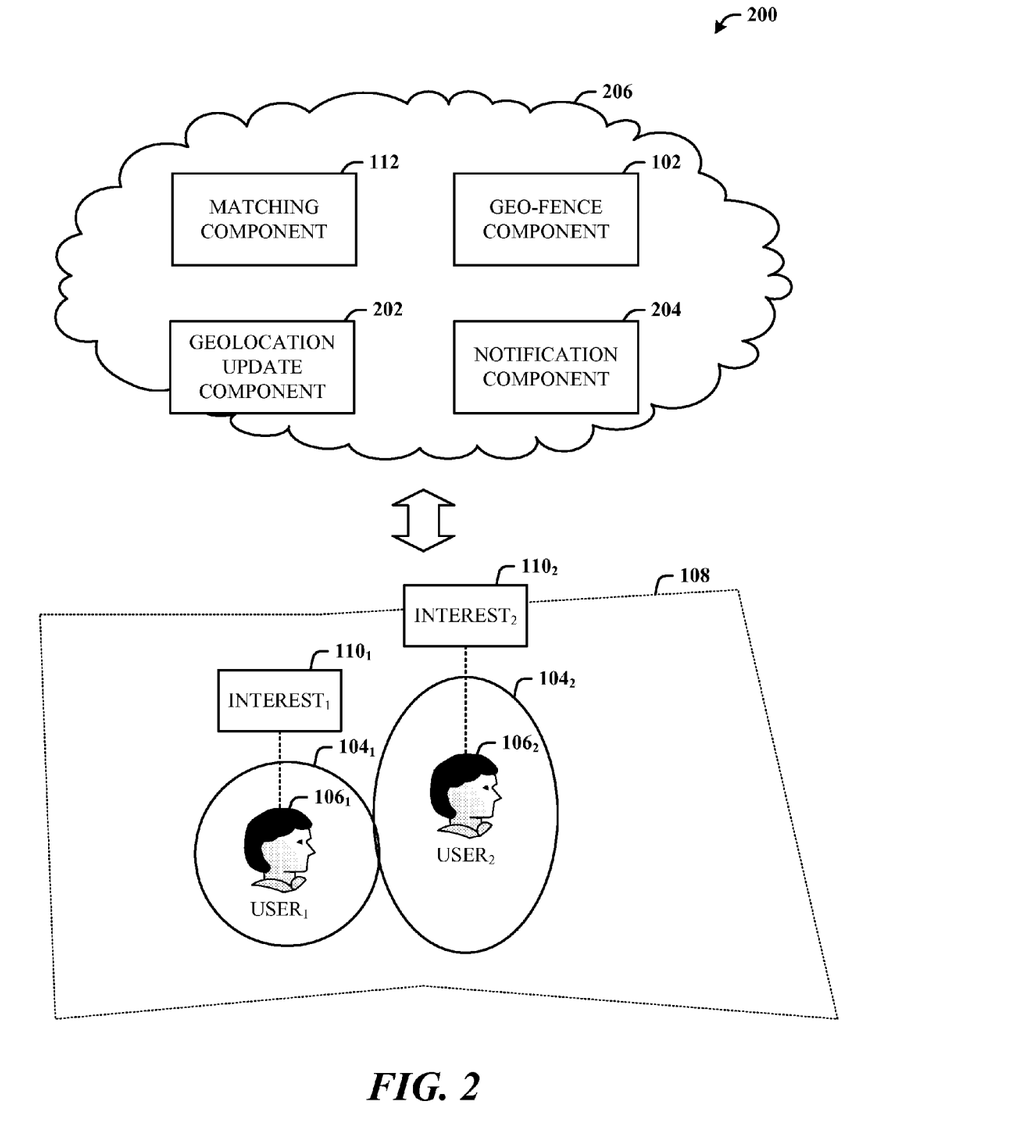
FIG. 2 illustrates a system that further includes notification capability for the users of the matching interests.

FIG. 2 illustrates a system 200 that further includes notification capability for the users of the matching interests. The system 200 shows the geo-fence component 102 and matching component 112 as network-based (e.g., cloud-based) entities that operate in wireless communications with mobile devices of the first user $106_1$ and the second user $106_2$. As the users ($106_1$ and $106_2$) move around in the area 108, it is possible that eventually the boundaries defined by the respective geo-fences ($104_1$ and $104_2$) are computed to have intersected (overlapped) at some point.

The system 200 further comprises a geolocation update component 202 that continually updates geographic locations of the users ($106_1$ and $106_2$) to identify existing and new locations of the users ($106_1$ and $106_2$) based on movement of users in the geographical area 108. The geolocation update component 202 can be any technology that facilitates the identification of a user geographically, such as GPS (global positioning system), a triangulation technology, or the like.

The system 200 further comprises a notification component 204 that notifies one or more of the users ($106_1$ and $106_2$) of matching interests in response to the geo-fences ($104_1$ and $104_2$) that intersect. The notification component 204 can also suggest other items of interest to the users ($106_1$ and $106_2$) having matched interests, where the suggested items of interest are presently occurring or likely to occur sufficiently soon after triggering from intersection of the geo-fences (e.g., within minutes, an hour, etc.) while the users are in the area 108.

The geolocation update component 202, matching component 112, geo-fence component 102, and notification component 204 are shown as network-based (e.g., cloud 206). The geolocation update component 202 receives updates as background operations of mobile devices (not shown, but it is understood that each user has an operating mobile device) of the users ($106_1$ and $106_2$).

Note that the geo-fences ($104_1$ and $104_2$) can be created as the same size for all users, and/or in different sizes based on different interests. For example, all users seeking matching interests can have assigned moving circular geo-fences of a fixed radius (e.g., two miles) with the users located at the circle center. Thus, when two moving geo-fences intersect, the users are approximately a distance of four miles apart. It is to be appreciated, however, that the distance may not need to be the direct straight-line distance, but can be the indirect distance related to travel of major roads and highways between the users.

It can also be the case that each user has multiple geo-fences created and functioning for different interests at a given point in time. For example, if a user leaves work during lunch hour to find a car, one geo-fence can be created for matching interests in the car transaction, and another geo-fence can be created for matching interests in finding a favorite type of food vendor, such as a travelling hotdog cart, that moves in the area 108 to sell food on street corners.

It can also be the case that geo-fences change in size (radius) with movement, time, or based on other criteria. For example, if a user has only a fixed amount of time (e.g., two hours) to find a particular product or item of interest in the area 108, the geo-fence $104_1$ of the user $106_1$ can increase in size (e.g., radius) to "sweep" a wider area as the two-hour time period nears expiration. Note that as illustrated, the geo-fences can be different geometric shapes such as circles, elliptical, and also polygons, for example.

As indicated herein, the geo-fence can relate to a specific interest. However, it is to be appreciated that the geo-fence can also be assigned to a category of interests. For example, the category can be all vehicles for sale, such that users seeking to sell a car will be matched with the interest of a user seeking to buy a car, once the respective geo-fences intersect.

Figure 3:
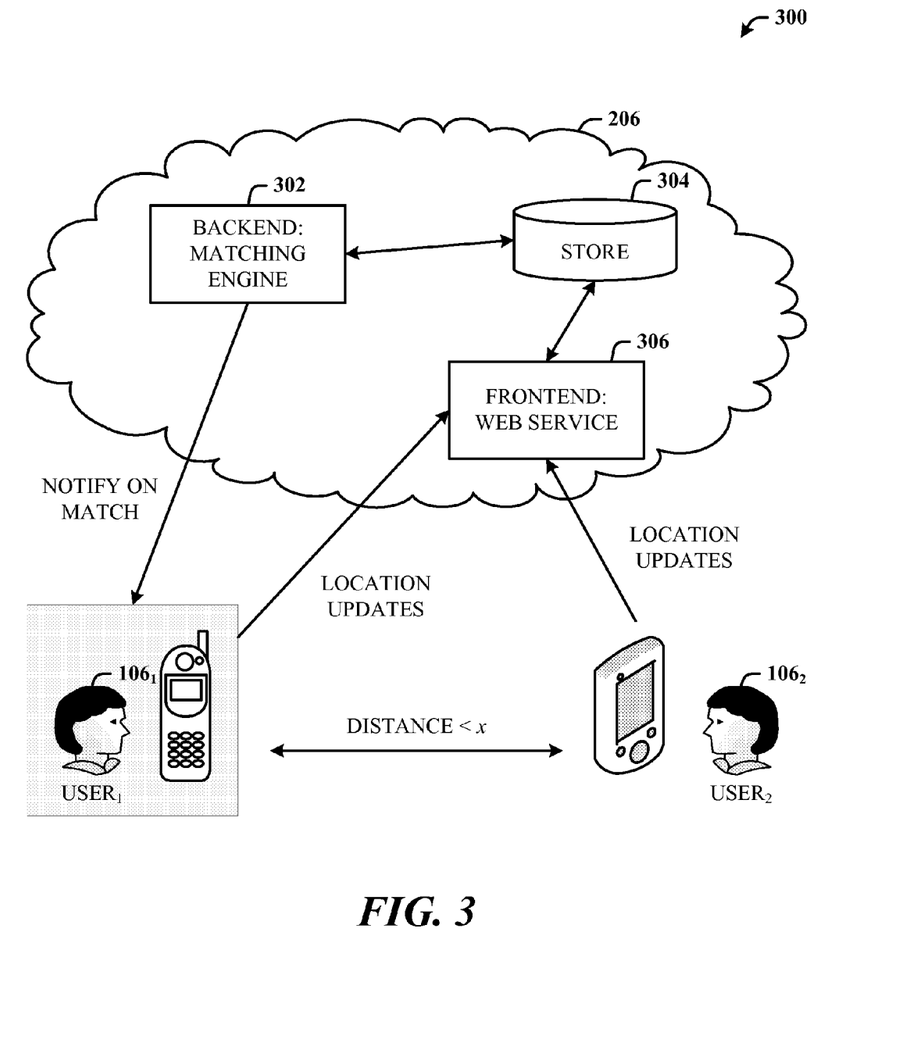
FIG. 3 illustrates an alternative system of dynamic geo-fences for matching interests.

FIG. 3 illustrates an alternative system 300 of dynamic geo-fences for matching interests. The system 300 shows the two users ($106_1$ and $106_2$) moving in an area and where the associated geo-fences (not shown) may or may not have triggered as the users ($106_1$ and $106_2$) move in the area and according to a predetermined distance x of each other.

The system 300 includes as network-based components, a backend matching engine 302, a data store 304, and a frontend web service 306. The matching engine 302 can include the capabilities of the geo-fence component 102. Alternatively, the store 304 can include the capabilities of the geo-fence component 102, since the data used for computing geo-fence intersection resides on the store 304.

The store 304 can store all the data used to perform matching and geolocation based processing. For example, the store 304 can store the created and assigned geo-fence ($104_1$ and $104_2$, not shown) dimension and coordinate information in association with the users, and which is utilized when a user travels in the area and chooses interest matching of specific interests. The store 304 can also store user profile information as to one or more interests the user chooses to match while traveling in various areas, and to use for suggesting other interests for matching.

The store 304 communicates with the web service 306 and receives the location updates from the users during interest matching. This update information is then processed at the store 304 and/or by the matching engine 302 to determine is matches have been detected. The user mobile devices (e.g., cell phones, tablet PCs, portable computers, etc.) communicate (e.g., continually, sufficiently frequently) location updates from the users ($106_1$ and $106_2$) to the web service 306, as background operations. Thus, the location updates and matching operations described herein can be performed transparently as perceived by the user, other than when a notification is sent to the user device as to another user having a matching interest being nearby.

It is to be understood a "match" in this context means that the geo-fences have been computed as intersecting, and thus, a matching interest has been detected between at least two users and within the geo-fence distances.

In an alternative embodiment, it can be the case that a user having a given active interest is notified that another user having a matching interest is in the area, but not yet within the geo-fence area created for the user. This can operate as a "heads-up" that it may be possible that the other user might eventually travel into the geo-fence area of the user, although it is not certain. It can also be the case that the other user chooses to not be notified unless the user is within the geo-fence distance.

It is within contemplation of the disclosed architecture that given the moving (dynamic) geo-fences, heading and speed can be computed such that upon notification of a user having matching interest, the user can also receive a basic set of information as to the time to meet the other user given the current heading and speed of the user relative to the other user. Again, this can account for roads, road conditions, weather conditions, etc.

The matching engine 302, as one function, notifies the first user 106₁ that the second user 106₂ with the matching interest has been detected within the geo-fence area. Thus, the matching engine 302 also includes notification capabilities to facilitate communications (e.g., text messaging, call, etc.) to the first user 106₁ (and/or the second user 106₂) of the notification component 204.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
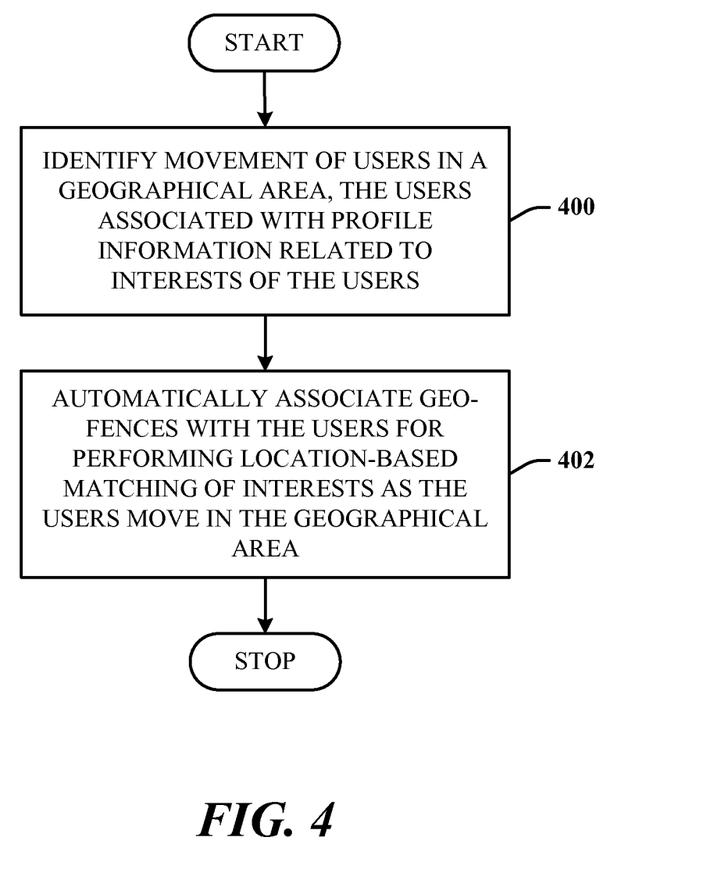
FIG. 4 illustrates a method in accordance with the disclosed architecture.

FIG. 4 illustrates a method in accordance with the disclosed architecture. At 400, movement of users in a geographical area is identified. This can be by GPS or other geolocation-based technologies. The users are associated with profile information related to interests of the users. Users of the architecture complete profiles that are then processed at the appropriate time for dynamic geo-fence interest matching. Users can update existing profiles or create new profiles for new interests. Once the profile is completed/updated, it is automatically uploaded/processed in realtime, or as needed. For example, a new profile can be created and considered in realtime as the user travels in the area. User profiles can also be bounded temporally if desired, with start and stop times. For example, it may be the instance where the user only seeks a match within a one-hour period of time; thereafter, the profile ages out, until reactivated. At 402, geo-fences are created and automatically associated with the users for performing location-based matching of interests as the users move in the geographical area.

The method can comprise acts of matching interests common to the users as the users move in the geographical area, and continuously identifying the geographic location of the users with matching interests to compute intersections of the associated geo-fences.

The method can further comprise acts of notifying a user and a second user, with a common interest and intersecting geo-fences, of presence of each other in the geographical area, and continually matching profiles of the users to find the matching interests. It can be the case, however, that only one of the users is notified. The method can further comprise notifying (suggesting) users of common interests of other items occurring and that might be of interest.

The dimension of the geo-fence for a given user can be automatically defined or manually defined. For example, if the area in which the user travels is expansive (much larger than a metropolitan area but not as densely populated), such as a small town in Wyoming versus a suburban area of Chicago, it can be more beneficial to use larger geo-fences to detect users of matching interests. Thus, the dynamic geo-fences can be defined for the user based on the area of usage and/or the user can manually define the range (size of the geo-fence) to create and use.

The geo-fences of matching users can be configured according to dimensions related to a given interest. For example, if the interest to be matched is deemed to be of utmost importance, the geo-fence can be larger for a given area to detect the matching interest more quickly or with a higher degree of probability.

Figure 5:
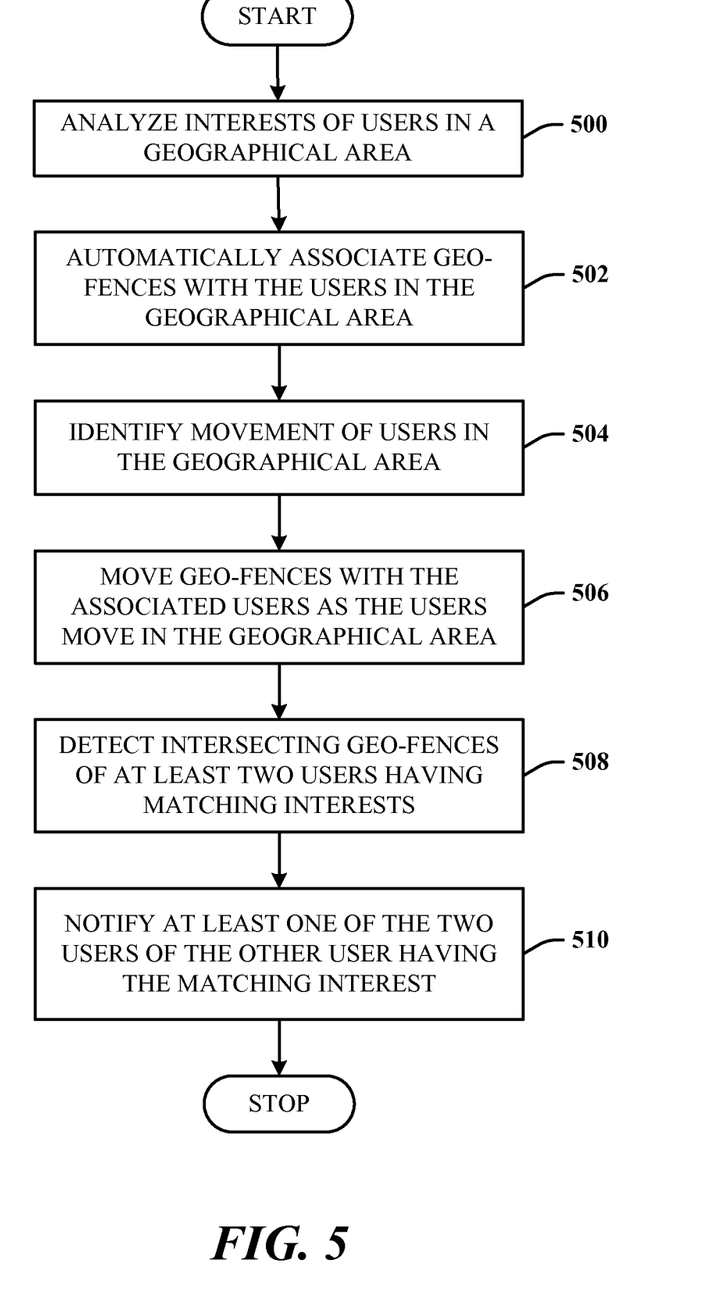
FIG. 5 illustrates an alternative method in accordance with the disclosed architecture.

FIG. 5 illustrates an alternative method in accordance with the disclosed architecture. At 500, interests of users in a geographical area are analyzed. At 502, geo-fences are automatically associated with the users in the geographical area. At 504, movement of users in the geographical area is identified. At 506, the geo-fences are moved with the associated users as the users move in the geographical area. At 508, the intersection of geo-fences of at least two users is detected and which users have matching interests. At 510, at least one of the two users is notified of the other user having the matching interest.

The method can further comprise acts of continuously updating geographic locations of the users with matching interests to detect the intersecting geo-fences, and suggesting other items of interest to the users having matched interests, the suggested items of interest presently occurring. The method can further comprise acts of deriving the interests of the users from user information stored on a network and, creating and associating a new geo-fence of a different size with a user based on a correspondingly different interest.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 6:
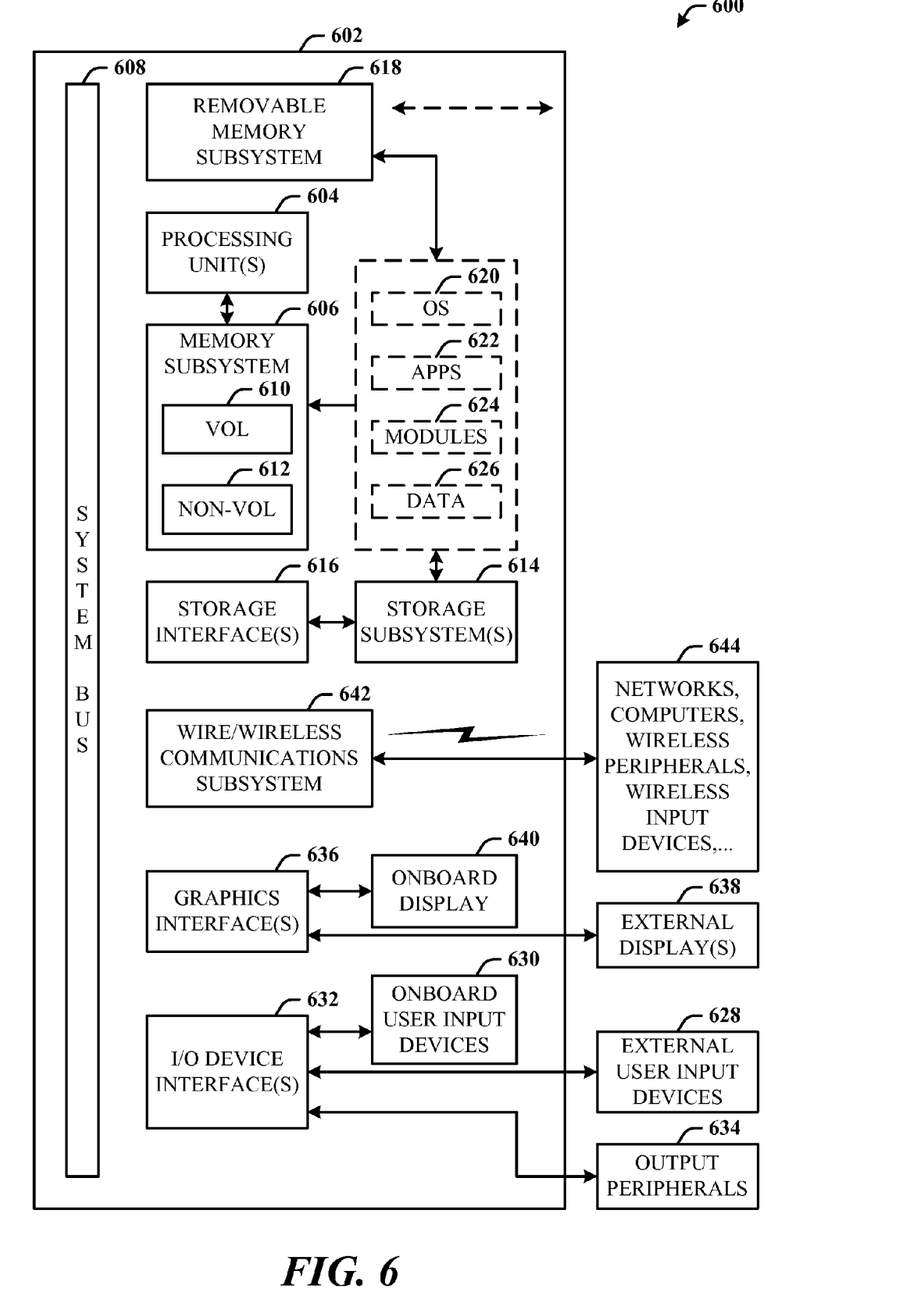
FIG. 6 illustrates a block diagram of a computing system that executes mutual interest location matching in accordance with the disclosed architecture.

Referring now to FIG. 6, there is illustrated a block diagram of a computing system 600 that executes mutual interest location matching in accordance with the disclosed architecture. However, it is appreciated that the some or all aspects of the disclosed methods and/or systems can be implemented as a system-on-a-chip, where analog, digital, mixed signals, and other functions are fabricated on a single chip substrate. Moreover, mobile devices such as cell phones can utilize the disclosed architecture.

In order to provide additional context for various aspects thereof, FIG. 6 and the following description are intended to provide a brief, general description of the suitable computing system 600 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 600 for implementing various aspects includes the computer 602 having processing unit(s) 604, a computer-readable storage such as a system memory 606, and a system bus 608. The processing unit(s) 604 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 606 can include computer-readable storage (physical storage media) such as a volatile (VOL) memory 610 (e.g., random access memory (RAM)) and non-volatile memory (NON-VOL) 612 (e.g., ROM, EPROM, EEPROM, etc.). A basic input/output system (BIOS) can be stored in the non-volatile memory 612, and includes the basic routines that facilitate the communication of data and signals between components within the computer 602, such as during startup. The volatile memory 610 can also include a high-speed RAM such as static RAM for caching data.

The system bus 608 provides an interface for system components including, but not limited to, the system memory 606 to the processing unit(s) 604. The system bus 608 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 602 further includes machine readable storage subsystem(s) 614 and storage interface(s) 616 for interfacing the storage subsystem(s) 614 to the system bus 608 and other desired computer components. The storage subsystem(s) 614 (physical storage media) can include one or more of a hard disk drive (HDD), a magnetic floppy disk drive (FDD), and/or optical disk storage drive (e.g., a CD-ROM drive DVD drive), for example. The storage interface(s) 616 can include interface technologies such as EIDE, ATA, SATA, and IEEE 1394, for example.

One or more programs and data can be stored in the memory subsystem 606, a machine readable and removable memory subsystem 618 (e.g., flash drive form factor technology), and/or the storage subsystem(s) 614 (e.g., optical, magnetic, solid state), including an operating system 620, one or more application programs 622, other program modules 624, and program data 626.

The operating system 620, one or more application programs 622, other program modules 624, and/or program data 626 can include entities and components of the system 100 of FIG. 1, entities and components of the system 200 of FIG. 2, entities and flow of the diagram 300 of FIG. 3, and the methods represented by the flowcharts of FIGS. 4 and 5, for example.

Generally, programs include routines, methods, data structures, other software components, etc., that perform particular tasks or implement particular abstract data types. All or portions of the operating system 620, applications 622, modules 624, and/or data 626 can also be cached in memory such as the volatile memory 610, for example. It is to be appreciated that the disclosed architecture can be implemented with various commercially available operating systems or combinations of operating systems (e.g., as virtual machines).

The storage subsystem(s) 614 and memory subsystems (606 and 618) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that does not employ propagated signals, can be accessed by the computer 602, and includes volatile and non-volatile internal and/or external media that is removable or non-removable. For the computer 602, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 602, programs, and data using external user input devices 628 such as a keyboard and a mouse. Other external user input devices 628 can include a microphone, an IR (infrared) remote control, a joystick, a game pad, camera recognition systems, a stylus pen, touch screen, gesture systems (e.g., eye movement, head movement, etc.), and/or the like. The user can interact with the computer 602, programs, and data using onboard user input devices 630 such a touchpad, microphone, keyboard, etc., where the computer 602 is a portable computer, for example. These and other input devices are connected to the processing unit(s) 604 through input/output (I/O) device interface(s) 632 via the system bus 608, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 632 also facilitate the use of output peripherals 634 such as printers, audio devices, camera devices, and so on, such as a sound card and/or onboard audio processing capability.

One or more graphics interface(s) 636 (also commonly referred to as a graphics processing unit (GPU)) provide graphics and video signals between the computer 602 and external display(s) 638 (e.g., LCD, plasma) and/or onboard displays 640 (e.g., for portable computer). The graphics interface(s) 636 can also be manufactured as part of the computer system board.

The computer 602 can operate in a networked environment (e.g., IP-based) using logical connections via a wired/wireless communications subsystem 642 to one or more networks and/or other computers. The other computers can include workstations, servers, routers, personal computers, microprocessor-based entertainment appliances, peer devices or other common network nodes, and typically include many or all of the elements described relative to the computer 602. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 602 connects to the network via a wired/wireless communication subsystem 642 (e.g., a network interface adapter, onboard transceiver subsystem, etc.) to communicate with wired/wireless networks, wired/wireless printers, wired/wireless input devices 644, and so on. The computer 602 can include a modem or other means for establishing communications over the network. In a networked environment, programs and data relative to the computer 602 can be stored in the remote memory/storage device, as is associated with a distributed system. It will be appreciated that the network connections shown are exemplary and other means of establishing a communications link between the computers can be used.

The computer 602 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a geo-fence component configured to generate geo-fences, where the geo-fences can be of different sizes based on different interests:
   generate a first geo-fence associated with a first user based on a first user profile of the first user and a current geographic location of the first user in a geographical area, the first geo-fence moves with the first user in the geographical area, the first geo-fence having a geometric shape that is determined based on an interest of the first user as specified in the first user profile; and
   generate a second geo-fence associated with a second user based on a second user profile of the second user and a current geographic location of the second user in the geographical area, the second geo-fence moves with the second user in the geographical area, the second geo-fence having a geometric shape that is determined based on an interest of the second user as specified in the second user profile;
   a matching component configured to identify a match in the interests of the first user and the second user moving in the geographical area when the first geo-fence and the second geo-fence intersect; and
   a microprocessor that executes computer-executable instructions associated with at least one of the geo-fence component or the matching component.

2. The system of claim 1, further comprising a geolocation update component configured to continually update geographic locations of the first user and the second user to identify the geographic locations of the first user and the second user based on movement of first user and the second user in the geographical area.

3. The system of claim 2, wherein the geolocation update component, matching component, and the geo-fence component are network-based, and the geolocation update component receives updates as background operations of mobile devices of the first user and the second user.

4. The system of claim 1, further comprising a notification component configured to notify at least one of the first user or the second user of matching interests in response to geo-fences that intersect.

5. The system of claim 4, wherein the notification component suggests other items of interest to users having matched interests, the suggested items of interest presently occurring.

6. The system of claim 1, wherein the geo-fence relates to a specific interest or a category of interests.

7. A method, comprising acts of:
   identifying movement of users in a geographical area, the users associated with profile information related to interests of the users;
   configuring and associating geo-fences with the users for performing location-based matching of interests as the users move in the geographical area, the geo-fence of a given user configured according to a dimension that relates to the interest of the given user;
   detecting intersecting geo-fences within the geographical area of users having matching interests; and
   configuring at least one processor to perform at least one of the acts of identifying, associating, configuring geo-fences, or detecting.

8. The method of claim 7, further comprising matching interests common to the users as the users move in the geographical area.

9. The method of claim 7, further comprising continuously identifying geographic location of the users with matching interests to compute intersections of the associated geo-fences.

10. The method of claim 7, further comprising notifying a user and a second user, with a common interest and intersecting geo-fences, of presence of each other in the geographical area.

11. The method of claim 7, further comprising continually matching profiles of the users to find the matching interests.

12. The method of claim 7, further comprising notifying users of common interests of other items occurring and that might be of interest.

13. The method of claim 7, further comprising automatically defining a dimension of the geo-fence for a given user.

14. A method, comprising acts of:
   analyzing interests of users in a geographical area, the interests derived from users of a network;
   associating geo-fences with the users in the geographical area;

identifying movement of users in the geographical area;

moving the geo-fences with the associated users as the users move in the geographical area;

detecting intersecting geo-fences of at least two users having matching interests;

notifying at least one of the two users of presence of the other user having the matching interest; and configuring at least one processor to perform at least one of the acts of analyzing, associating, identifying, moving, detecting, or notifying.

15. The method of claim 14, further comprising continuously updating geographic locations of the users with matching interests to detect the intersecting geo-fences.

16. The method of claim 14, further comprising suggesting other items of interest to the users having matched interests, the suggested items of interest presently occurring.

17. The method of claim 14, further comprising deriving the interests of the users from user information stored on the network as user profiles.

18. The method of claim 14, further comprising creating and associating a new geo-fence of a different size with a user based on a correspondingly different interest.

19. The method of claim 7, further comprising updating existing profile information or creating new profile information of interests, uploading the updated profile information or the new profile information, and detecting intersecting geo-fences based on the updated profile information or the new profile information.

20. The method of claim 7, further comprising bounding the profile information of a user temporally and processing the profile information of the user for location-based matching based on a start time and a stop time.

* * * * *